(12) United States Patent
Kumazaki

(10) Patent No.: US 12,162,469 B2
(45) Date of Patent: Dec. 10, 2024

(54) CONTROLLER, METHOD, AND COMPUTER PROGRAM FOR CONTROLLING TRANSMISSION

(71) Applicant: TOYOTA JIDOSHA KABUSHIKI KAISHA, Toyota (JP)

(72) Inventor: Kenta Kumazaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 215 days.

(21) Appl. No.: 18/054,190

(22) Filed: Nov. 10, 2022

(65) Prior Publication Data

US 2023/0174044 A1 Jun. 8, 2023

(30) Foreign Application Priority Data

Dec. 7, 2021 (JP) ................. 2021-198729

(51) Int. Cl.
*B60W 20/15* (2016.01)
*B60W 20/30* (2016.01)
*B60W 30/18* (2012.01)
*B60W 40/072* (2012.01)

(52) U.S. Cl.
CPC ............ *B60W 20/15* (2016.01); *B60W 20/30* (2013.01); *B60W 30/18163* (2013.01); *B60W 40/072* (2013.01); *B60W 2710/0644* (2013.01)

(58) Field of Classification Search
CPC ................. B60W 20/15; B60W 20/30; B60W 30/18163; B60W 40/072; B60W 2710/0644
See application file for complete search history.

(56) References Cited

U.S. PATENT DOCUMENTS

| 10,926,779 B1* | 2/2021 | Sullivan | B60W 10/04 |
| 2009/0011887 A1* | 1/2009 | Komada | B60K 6/387 |
| | | | 477/3 |
| 2009/0187322 A1* | 7/2009 | Yasui | B60W 10/06 |
| | | | 701/70 |

(Continued)

FOREIGN PATENT DOCUMENTS

| JP | 2010-183733 A | 8/2010 |
| JP | 2010-249237 A | 11/2010 |

(Continued)

*Primary Examiner* — Jaime Figueroa
*Assistant Examiner* — Mohamad O El Sayah
(74) *Attorney, Agent, or Firm* — Dickinson Wright, PLLC

(57) ABSTRACT

A transmission controller includes a processor configured to set acceleration/deceleration start timing at which a vehicle starts accelerating or decelerating, based on at least one of a sensor signal representing the situation around the vehicle, the current position of the vehicle, a map including information on a road being traveled by the vehicle, and operation of the vehicle by a driver, downshift a second transmission of a power train including two motors and an engine before the acceleration/deceleration start timing, and control the power train to vary first and second gear ratios of a first transmission so as to keep the RPM of the engine constant. The first transmission is capable of steplessly varying the first and second gear ratios, which are gear ratios between one of the motors and the engine and between the other motor and the engine, respectively.

7 Claims, 7 Drawing Sheets

(56) References Cited

U.S. PATENT DOCUMENTS

| | | | |
|---|---|---|---|
| 2012/0265382 A1* | 10/2012 | Nefcy | B60W 10/188 |
| | | | 180/65.265 |
| 2015/0006000 A1* | 1/2015 | Kawata | B60L 58/13 |
| | | | 180/65.265 |
| 2015/0258982 A1* | 9/2015 | Tanaka | B60W 30/19 |
| | | | 180/65.265 |
| 2016/0068161 A1* | 3/2016 | Iketomi | B60W 20/00 |
| | | | 180/65.265 |
| 2017/0282900 A1* | 10/2017 | Suzuki | B60W 20/40 |
| 2018/0043899 A1* | 2/2018 | Prost | B60K 6/547 |
| 2018/0051802 A1* | 2/2018 | Ishiguro | F16H 59/18 |
| 2018/0099580 A1 | 4/2018 | Kumazaki et al. | |
| 2019/0129424 A1* | 5/2019 | Kishi | B60W 60/001 |
| 2020/0156618 A1* | 5/2020 | Kook | B60W 10/11 |
| 2020/0307542 A1* | 10/2020 | Engstrom | F16H 61/0213 |
| 2021/0206254 A1* | 7/2021 | Benedikt | B60K 6/36 |
| 2021/0221379 A1 | 7/2021 | Sato et al. | |

FOREIGN PATENT DOCUMENTS

| | | |
|---|---|---|
| JP | 2018-062247 A | 4/2018 |
| WO | 2020/008873 A1 | 1/2020 |

\* cited by examiner

CONTROLLER, METHOD, AND COMPUTER PROGRAM FOR CONTROLLING TRANSMISSION

FIELD

The present invention relates to a controller, a method, and a computer program for controlling transmission of a vehicle.

BACKGROUND

A "hybrid-type" power train including a motor as well as an internal combustion engine is used as a power train of a vehicle. Regarding such a hybrid-type power train, techniques to improve responsiveness of acceleration of a vehicle have been proposed (see Japanese Unexamined Patent Publication JP2010-183733A and International Publication WO2020/008873A).

A control device of an electric vehicle disclosed in JP2010-183733A predicts deceleration of the vehicle, based on at least information on travel environment or information on vehicle operation, and, when deceleration is predicted, reduces the gear ratio of a transmission before the deceleration of the vehicle starts. The control device controls the RPM (revolutions per minute) of a motor of a drive source from the start of reduction in the gear ratio until the start of deceleration of the vehicle to maintain the vehicle speed, and drives a generator connected to driving wheels via the transmission during the deceleration of the vehicle to recover regenerative energy.

A control device for vehicles disclosed in WO2020/008873A determines whether acceleration is limited, and limits a gear ratio when it is determined that acceleration is limited.

SUMMARY

In the above-described techniques, the engine RPM increases as the gear of a transmission is lowered. This will cause a power train to generate greater power than intended by a driver, and may make the driver uncomfortable. Additionally, the increase in the engine RPM may reduce engine efficiency and increase fuel consumption.

It is an object of the present invention to provide a transmission controller that prevents making a vehicle driver uncomfortable at acceleration and deceleration.

According to an embodiment, a transmission controller of a power train including a first transmission and a second transmission mounted on a vehicle is provided. The first transmission is capable of steplessly varying a first gear ratio between one of two motors and an engine and a second gear ratio between the other of the two motors and the engine so as to keep the ratio of the second gear ratio to the first gear ratio constant. The second transmission is capable of setting a gear position between one of the two motors and a driving wheel at one of a predetermined number of gear positions of different gear ratios. The transmission controller includes a processor configured to: set acceleration/deceleration start timing at which the vehicle starts accelerating or decelerating, based on at least one of a sensor signal representing the situation around the vehicle, the current position of the vehicle, a map including information on a road being traveled by the vehicle, and operation of the vehicle by a driver, downshift the second transmission before the acceleration/deceleration start timing, and control the power train to vary the first gear ratio and the second gear ratio of the first transmission so as to keep the RPM of the engine constant.

The processor of the transmission controller is preferably further configured to predict time from when a controller that controls driving of the vehicle proposes passing a leading vehicle traveling ahead of the vehicle until the driver performs operation of approval for the propose, based on elapsed time from a past proposal for passing until operation of approval, and the processor sets timing at which the vehicle starts accelerating as the acceleration/deceleration start timing, based on the predicted time.

In this case, the processor preferably determines a time after a period from the proposal for passing as the acceleration/deceleration start timing. The period is a predicted time from the proposal for passing until the driver performs operation of approval plus a predicted time required to confirm that passing of the leading vehicle can be started.

Alternatively, the processor preferably sets timing at which the vehicle starts decelerating as the acceleration/deceleration start timing, based on the distance in a travel direction of the vehicle from the vehicle to a next curve and at least one of the speed of the vehicle and the radius of curvature of the next curve.

Alternatively, the processor preferably sets timing at which the vehicle starts decelerating as the acceleration/deceleration start timing, based on the distance in a travel direction of the vehicle from the vehicle to a deceleration-required location at which deceleration is required and at least one of the speed of the vehicle and a drivable speed of the vehicle at the deceleration-required location.

According to another embodiment, a method for controlling transmission of a power train including a first transmission and a second transmission mounted on a vehicle is provided. The first transmission is capable of steplessly varying a first gear ratio between one of two motors and an engine and a second gear ratio between the other of the two motors and the engine so as to keep the ratio of the second gear ratio to the first gear ratio constant. The second transmission is capable of setting a gear position between one of the two motors and a driving wheel at one of a predetermined number of gear positions of different gear ratios. The method includes setting acceleration/deceleration start timing at which the vehicle starts accelerating or decelerating, based on at least one of a sensor signal representing the situation around the vehicle, the current position of the vehicle, a map including information on a road being traveled by the vehicle, and operation of the vehicle by a driver, downshifting the second transmission before the acceleration/deceleration start timing, and controlling the power train to vary the first gear ratio and the second gear ratio of the first transmission so as to keep the RPM of the engine constant.

According to still another embodiment, a non-transitory recording medium that stores a computer program for controlling transmission of a power train including a first transmission and a second transmission mounted on a vehicle is provided. The first transmission is capable of steplessly varying a first gear ratio between one of two motors and an engine and a second gear ratio between the other of the two motors and the engine so as to keep the ratio of the second gear ratio to the first gear ratio constant. The second transmission is capable of setting a gear position between one of the two motors and a driving wheel at one of a predetermined number of gear positions of different gear ratios. The computer program includes instructions causing a processor mounted on the vehicle to execute a process including setting acceleration/deceleration start timing at which the vehicle starts accelerating or decelerating, based on at least one of a sensor signal representing the situation around the vehicle, the current position of the vehicle, a map including information on a road being traveled by the vehicle, and operation of the vehicle by a driver, downshifting the second transmission before the acceleration/deceleration start timing, and controlling the power train to vary the first gear ratio and the second gear ratio of the first transmission so as to keep the RPM of the engine constant.

The transmission controller according to the present disclosure has an advantageous effect of being able to prevent making a vehicle driver uncomfortable at acceleration and deceleration.

DESCRIPTION OF EMBODIMENTS

A transmission controller, a method for controlling transmission and a computer program for controlling transmission executed by the transmission controller will now be described with reference to the attached drawings. The transmission controller controls transmission of a power train including two motors and an engine. The transmission controller sets acceleration/deceleration start timing at which a vehicle starts accelerating or decelerating, based on at least one of a sensor signal representing the situation around the vehicle, the current position of the vehicle, a map including information on a road being traveled by the vehicle, and operation of the vehicle by a driver. Before the acceleration/deceleration start timing, the transmission controller downshifts a second transmission capable of setting a gear position between one of the two motors and a driving wheel at one of a predetermined number of gear positions of different gear ratios. Additionally, the transmission controller controls the power train so as to keep the RPM of the engine constant.

Figure 1:
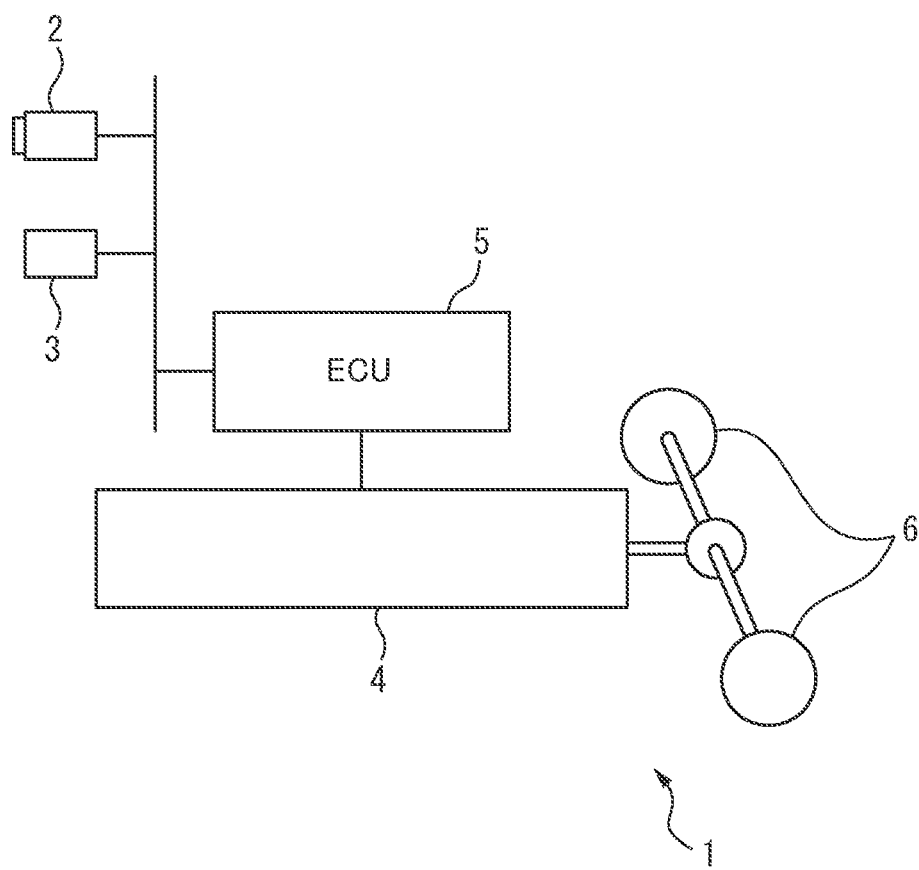
FIG. 1 schematically illustrates the configuration of a vehicle control system including a transmission controller and a power train.
Figure 2:
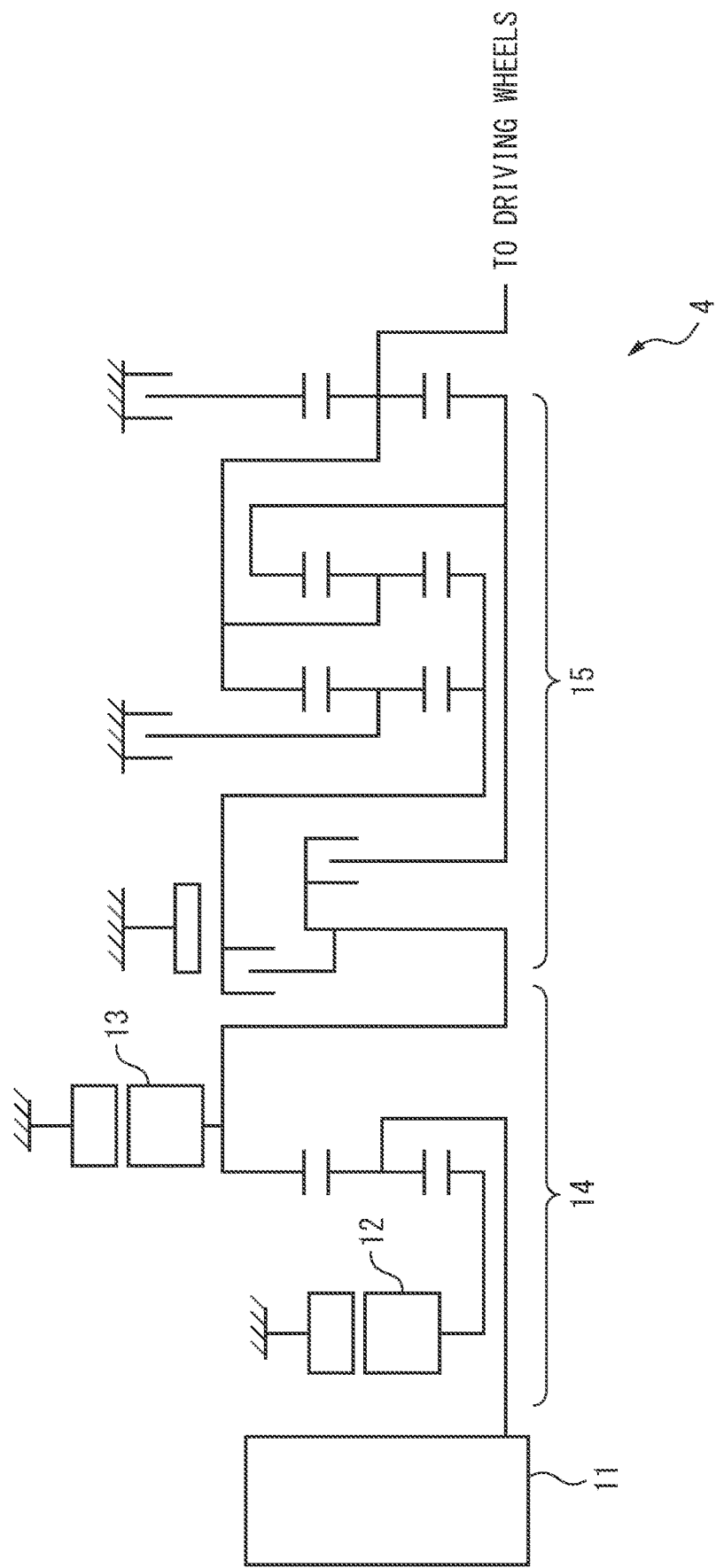
FIG. 2 schematically illustrates the configuration of the power train.

FIG. 1 schematically illustrates the configuration of a vehicle control system including a transmission controller and a power train. FIG. 2 schematically illustrates the configuration of the power train. In the present embodiment, the vehicle control system, which is mounted on a vehicle 1 and controls the vehicle 1, includes a camera 2, a GPS receiver 3, a power train 4, and an electronic control unit (ECU) 5, which is an example of the transmission controller. The camera 2 and the GPS receiver 3 are communicably connected to the ECU 5 via an in-vehicle network conforming to a standard such as a controller area network. The vehicle control system may further include a range sensor (not illustrated), such as LiDAR or radar, which measures the distances from the vehicle 1 to objects around the vehicle 1. The vehicle control system may further include a wireless communication terminal (not illustrated) for wireless communication with a device outside the vehicle 1, and a navigation device (not illustrated) for setting a planned travel route of the vehicle 1.

The camera 2, which is an example of a sensor that generates a sensor signal representing the situation around the vehicle 1, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 1 so as to be oriented, for example, to the front of the vehicle 1. The camera 2 captures a region in front of the vehicle 1 every predetermined capturing period (e.g., 1/30 to 1/10 seconds), and generates images representing this region. Each image obtained by the camera 2 is an example of the sensor signal. The vehicle 1 may include multiple cameras taking pictures in different orientations or having different focal lengths.

Whenever an image is generated, the camera 2 outputs the image to the ECU 5 via the in-vehicle network.

The GPS receiver 3 receives GPS signals from GPS satellites at predetermined intervals, and determines the position of the vehicle 1, based on the received GPS signals. The GPS receiver 3 outputs positioning information indicating the result of determination of the position of the vehicle 1 based on the GPS signals to the ECU 5 via the in-vehicle network at predetermined intervals. Instead of the GPS receiver, the vehicle 1 may include a receiver that receives positioning signals from satellites of another satellite positioning system to determine the position of the vehicle 1.

The power train 4 includes an internal combustion engine 11 and two motors 12 and 13 as power sources. Of the two motors 12 and 13, the motor 13 also operates as a generator for recovering regenerative energy at deceleration of the vehicle 1. The power train 4 further includes a continuously variable transmission 14 and an automatic transmission 15, which are provided on a transmission path of motive power between left and right driving wheels 6 of the vehicle 1 and the engine 11. The continuously variable transmission 14 and the automatic transmission 15 are an example of the first transmission and the second transmission, respectively. The left and right driving wheels 6 of the vehicle 1 may be the rear wheels of the vehicle 1, but are not limited thereto and may be the front wheels of the vehicle 1.

The continuously variable transmission 14 includes a planetary gear mechanism as a differential gear mechanism. The planetary gear mechanism includes a planetary carrier, a sun gear, a ring gear, and a pinion so that they are differentially rotatable. The planetary carrier is coupled to the crankshaft of the engine 11. The sun gear is coupled to the rotating shaft of the motor 12. The ring gear is disposed outside the sun gear. The pinion is coupled to the planetary carrier, disposed between the sun gear and the ring gear, and provided to engage with the inside of the sun gear and the ring gear. Additionally, the ring gear is disposed so that its outer rim engages with a gear on the output of a speed reducer. To a gear on the input of the speed reducer is coupled the rotating shaft of the motor 13. Such a structure enables the continuously variable transmission 14 to continuously and steplessly vary the rotational speeds of the motors 12 and 13, which are differential rotational speeds relative to the rotational speed of the engine 11. In other words, the continuously variable transmission 14 can steplessly vary a first gear ratio of the rotational speed of the motor 13 to that of the engine 11 and a second gear ratio of the rotational speed of the motor 12 to that of the engine 11. Additionally, the continuously variable transmission 14 keeps the ratio of the second gear ratio to the first gear ratio constant. Output torque from the engine 11 and the motors 12 and 13 is outputted to the automatic transmission 15 by rotation of a rotating shaft coupled to the gear on the output of the speed reducer of the continuously variable transmission 14 (i.e., an output shaft of the continuously variable transmission 14).

The automatic transmission 15 may be a transmission capable of setting a gear position between the motor 13 and the driving wheels 6 at one of a predetermined number of gear positions of different gear ratios. For example, the automatic transmission 15 is configured as a mechanical transmission. The automatic transmission 15 transmits the rotation transmitted via the output shaft of the continuously variable transmission 14 to one of multiple forward gears or a single reverse gear by selectively actuating hydraulic friction couplers (not illustrated) and then outputs the rotation via an output shaft of the automatic transmission 15. Torque outputted by the rotation of the output shaft of the automatic transmission 15 is transmitted to the left and right driving wheels 6 of the vehicle 1 via a differential gear (not illustrated).

The ECU 5 controls the components of the power train 4. The ECU 5 controls the power train according to the speed of the vehicle 1 and driver-requested torque depending on the amount of pressing-down of an accelerator pedal (not illustrated). To this end, the ECU 5 controls the amount of fuel supplied to the engine 11, electric power supplied to the motors 12 and 13, and transmission by the automatic transmission 15 so as to maximize the fuel efficiency of the engine 11.

The ECU 5 is communicably connected to an ECU for driving control (not illustrated) via the in-vehicle network. The ECU 5, together with the ECU for driving control, sets acceleration/deceleration start timing at which the vehicle 1 starts accelerating or decelerating, based on at least one of an image from the camera 2, the current position of the vehicle 1, map information, and operation of the vehicle 1 by the driver. The ECU 5 then reduces the gear ratio of the automatic transmission 15 before the acceleration/deceleration start timing. Additionally, the ECU 5 varies the first gear ratio between the motor 13 and the engine 11 and the second gear ratio between the motor 12 and the engine 11 in the continuously variable transmission 14 so as to keep the RPM of the engine 11 constant.

Figure 3:
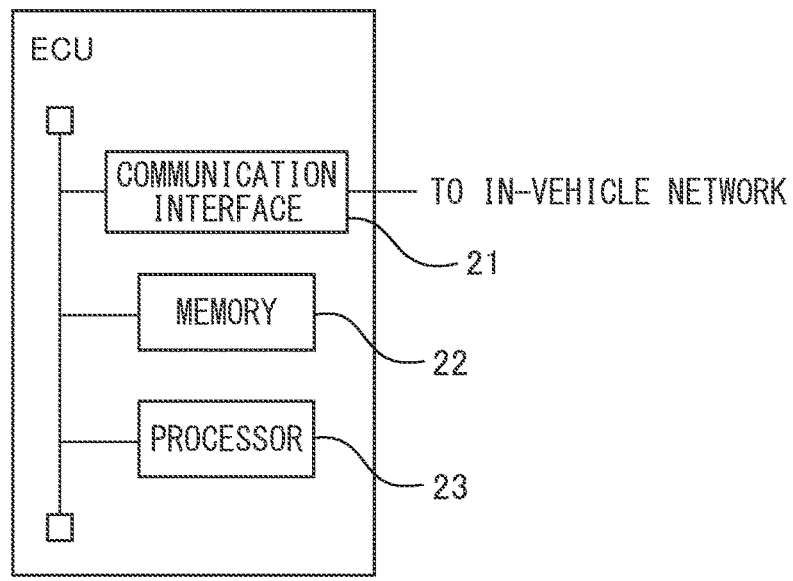
FIG. 3 illustrates the hardware configuration of an electronic control unit, which is an embodiment of the transmission controller.

FIG. 3 illustrates the hardware configuration of the ECU 5, which is an embodiment of the transmission controller. As illustrated in FIG. 3, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. Whenever an image is received from the camera 2, the communication interface 21 passes the image to the processor 23. Whenever positioning information is received from the GPS receiver 3, the communication interface 21 passes the positioning information to the processor 23. The communication interface 21 further includes an interface connected to the components of the power train 4 and an interface connected to various sensors for detecting information indicating the motion of the vehicle 1, such as a vehicle speed sensor. The communication interface 21 receives sensor signals from the various sensors and passes the sensor signals to the processor 23, and outputs a control signal for controlling the components of the power train 4 received from the processor 23 to the power train 4.

The memory 22, which is an example of a storage unit, includes, for example, volatile and nonvolatile semiconductor memories, and stores various types of data used in a transmission control process executed by the processor 23. For example, the memory 22 stores map information including information on roads, such as the positions of freeway ramps, regulation speeds of road sections, and the positions and radii of curvature of curves. The memory 22 further stores various reference tables and history information on elapsed time from when a proposal for passing is made until the driver's approval. The memory 22 further stores parameters of the camera 2, such as its focal length, direction of image capturing, and mounted position; various parameters for defining a classifier used for detecting a road structure around the vehicle 1; positioning information of the vehicle 1; and images of the surroundings of the vehicle 1. Additionally, the memory 22 temporarily stores various types of data generated during the transmission control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the transmission control process at predetermined intervals.

Figure 4:
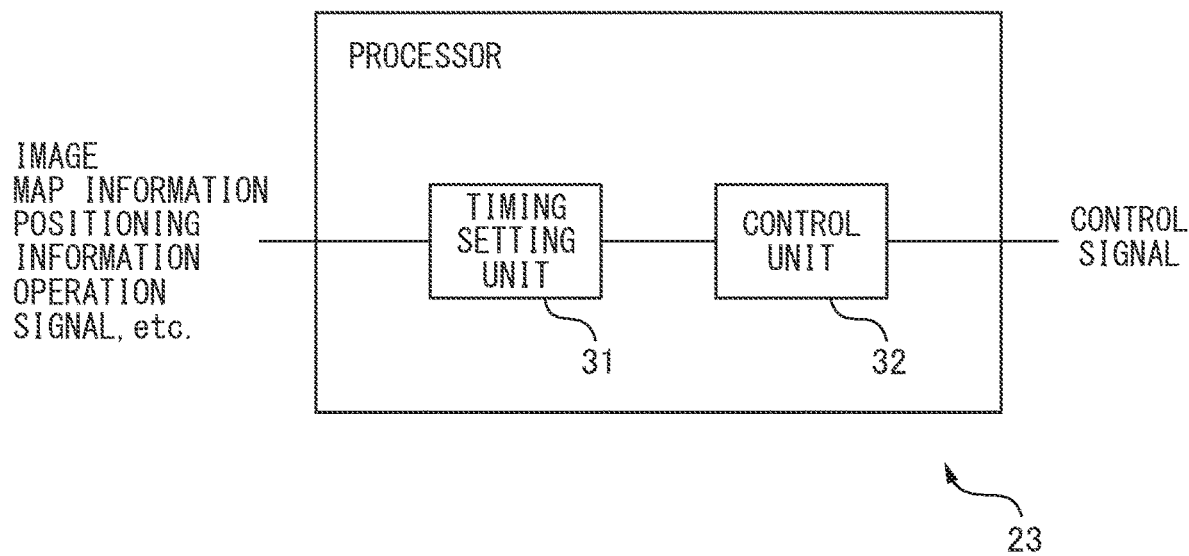
FIG. 4 is a functional block diagram of a processor of the electronic control unit, related to a transmission control process.

FIG. 4 is a functional block diagram of the processor 23, related to the transmission control process. The processor 23 includes a timing setting unit 31 and a control unit 32. These units included in the processor 23 are functional modules, for example, implemented by a computer program executed by the processor 23, or may be dedicated operating circuits provided in the processor 23.

The timing setting unit 31 sets the acceleration/deceleration start timing, based on at least one of an image from of the camera 2, the current position of the vehicle 1, a map including information on a road being traveled by the vehicle 1, and operation of the vehicle 1 by the driver. Additionally, the timing setting unit 31 sets timing a predetermined time earlier than the acceleration/deceleration start timing as gear change timing for lowering the gear of the automatic transmission 15 of the power train 4, i.e., for downshifting.

For example, the timing setting unit 31 sets the acceleration/deceleration start timing of the vehicle 1 when the vehicle 1 approaches a curve or a location at which the vehicle 1 is required to stop or decelerate, such as a freeway ramp. In this case, the acceleration/deceleration start timing is timing at which the vehicle 1 starts decelerating.

For example, when the vehicle 1 approaches a curve, the timing setting unit 31 identifies the curve closest to the current position of the vehicle 1 in the travel direction of the vehicle 1 (hereafter, the "next curve") by referring to the map information and the current position of the vehicle 1 indicated by the latest positioning information. The timing setting unit 31 then identifies the radius of curvature of the next curve by referring to the map information. The maximum speed at which the vehicle 1 can travel through the next curve (hereafter, the "drivable vehicle speed") is determined depending on the radius of curvature of the next curve. More specifically, the drivable vehicle decreases, as the radius of curvature of the next curve is smaller. The timing setting unit 31 compares the current speed of the vehicle 1 indicated by a measured value received by the ECU 5 from a vehicle speed sensor (not illustrated) with the drivable vehicle speed of the next curve. When the current speed of the vehicle 1 is higher than the drivable vehicle speed of the next curve, the timing setting unit 31 determines that deceleration is necessary at the next curve.

When it is determined that deceleration is necessary at the next curve, the timing setting unit 31 calculates the distance to the start point of the next curve by referring to the current position of the vehicle 1 and the map information. The timing setting unit 31 then sets timing at which the distance to the start point of the next curve will be equal to a predetermined distance as the acceleration/deceleration start timing. For example, the timing setting unit 31 determines the distance obtained by multiplying the current speed of the vehicle 1 by a deceleration time until the speed reaches the drivable vehicle speed as the predetermined distance. The deceleration time is set, for example, at several seconds so that a deceleration of the vehicle 1 at which the driver does not feel uncomfortable can be set. To the deceleration time may be added an offset time that is set depending on the radius of curvature of the next curve and the current speed of the vehicle 1. The timing setting unit 31 refers to a reference table representing the relationship between offset times and the radii of curvature of next curves and current speeds of the vehicle 1 to determine the offset time. This reference table is prestored in the memory 22. The offset time is set longer, for example, as the radius of curvature of the next curve is smaller or the current speed of the vehicle 1 is higher.

Additionally, the timing setting unit 31 determines a deceleration at which the vehicle 1 will decelerate at the acceleration/deceleration start timing. As the radius of curvature of the next curve is smaller or the current speed of the vehicle 1 is higher, the range of the vehicle speed to be reduced, which is the difference between the current vehicle speed and the drivable vehicle speed, is wider. Thus the timing setting unit 31 refers to a reference table representing the relationship between decelerations and the radii of curvature of next curves and current vehicle speeds to determine the deceleration. Such a reference table is prestored in the memory 22.

Additionally, the timing setting unit 31 sets the gear change timing at timing earlier than the acceleration/deceleration start timing by the time required to gear change of the automatic transmission 15 (hereafter, the "gear change time"). More specifically, the gear change timing is set at timing at which the vehicle 1 will reach a position nearer than the start point of the next curve by a distance obtained by adding a distance that is the product of the gear change time and the current speed of the vehicle 1 to the predetermined distance.

The timing setting unit 31 may determine to downshift the automatic transmission 15 only when the determined deceleration is greater than a predetermined threshold. The predetermined threshold is set, for example, at a deceleration such that regenerative torque required for the motor 13 to recover regenerative energy may be obtained.

When autonomous driving control or active cruise control is applied to the vehicle 1, the timing setting unit 31 may use the set vehicle speed of the vehicle 1, instead of the current speed of the vehicle 1, to determine the predetermined distance and the acceleration/deceleration start timing. Additionally, the timing setting unit 31 may estimate the radius of curvature of the next curve, based on an image received by the ECU 5 from the camera 2. In this case, the timing setting unit 31 detects a lane-dividing line from the image by inputting the image into a classifier that has been trained to detect lane-dividing lines. As such a classifier, the timing setting unit 31 may use, for example, a deep neural network (DNN) for semantic segmentation, such as U-Net. The timing setting unit 31 then projects the lane-dividing line in the image onto the real space, using parameters such as the mounted position, the direction of image capturing, and the focal length of the camera 2, and determines the radius of curvature of the projected lane-dividing line as that of the next curve.

When the vehicle 1 approaches a location at which the vehicle 1 is required to stop or decelerate, the timing setting unit 31 also sets the acceleration/deceleration start timing similarly. In this case also, the timing setting unit 31 identifies the deceleration-required location closest to the current position of the vehicle 1 in the travel direction of the vehicle 1 and the distance from the current position of the vehicle 1 to the location by referring to the map information and the current position of the vehicle 1 indicated by the latest positioning information. In the following description, a location at which the vehicle 1 is required to stop or decelerate may also be referred to as a target location. The target location may be, for example, a location beyond which the regulation speed is lower than that of the road being traveled by the vehicle 1 or at which the vehicle 1 is required to stop, e.g., a location immediately in front of a freeway ramp. The timing setting unit 31 sets timing at which the distance to the target location equals a predetermined distance as the acceleration/deceleration start timing.

The timing setting unit 31 determines a speed obtained by multiplying the regulation speed reduced at the target location by a predetermined factor (e.g., 0.7 to 0.9) as the drivable vehicle speed. When the target location is a location at which the vehicle 1 is required to stop, the timing setting unit 31 sets the drivable vehicle speed at 0. The timing setting unit 31 then refers to a reference table representing the relationship between such drivable vehicle speeds and current speeds of the vehicle 1 and offset times to determine the offset time. The timing setting unit 31 also refers to a reference table representing the relationship between decelerations and the distances to target locations and current speeds of the vehicle 1 to determine the deceleration. Such reference tables are prestored in the memory 22. In this case also, the set vehicle speed may be used instead of the current speed of the vehicle 1.

When the vehicle 1 passes a leading vehicle traveling ahead thereof, the timing setting unit 31 also sets the acceleration/deceleration start timing. In this case, the acceleration/deceleration start timing is timing at which the vehicle 1 starts accelerating.

For example, when the vehicle 1 is under autonomous driving control, the timing setting unit 31 sets the acceleration/deceleration start timing, with reference to a point of time at which the ECU for driving control (not illustrated) of the vehicle 1 makes a proposal for passing to the driver via a user interface (not illustrated) in the interior of the vehicle. The ECU for driving control detects a leading vehicle, for example, from time-series images generated by the camera 2 or time-series sensor signals by a range sensor, and measures the distance from the vehicle 1 to the detected leading vehicle. The ECU for driving control then makes a proposal for passing in the case that the distance from the vehicle 1 to the leading vehicle has not been greater than a predetermined distance threshold for a predetermined period or more and that the speed of the vehicle 1 is not greater than a predetermined speed threshold. After a proposal for passing is made, the driver operates an operating device of the vehicle 1 to approve the proposal; and then the ECU for driving control monitors the surroundings of the vehicle 1 to confirm the safety, and thereafter executes control for passing. The operating device may be, for example, an operating switch (not illustrated) provided on the steering wheel. Additionally, the control for passing causes the vehicle 1 to make a lane change and accelerate. Thus the timing setting unit 31 calculates a period obtained by adding a predicted time from the proposal for passing until the driver approves the proposal to a predicted time required for the ECU for driving control to monitor the surroundings of the vehicle 1 to confirm that passing of the leading vehicle can be started. The timing setting unit 31 then determines timing after the calculated period from the proposal for passing as the acceleration/deceleration start timing. The timing setting unit 31 determines a time earlier than the acceleration/deceleration start timing by the gear change time as the gear change timing.

The predicted time from the proposal for passing until the driver approves the proposal may be learned on the basis of history information on time required for the driver's operation to approve past proposals for passing. For example, the predicted time until approval for the proposal for passing is calculated by adding a preset standard response time to a value to correct the standard response time; the correction value is obtained by averaging time lags between proposals for passing and operation to approve the respective proposals for passing.

The predicted time required to monitor the surroundings of the vehicle 1 (hereafter, the "predicted monitoring time") is prestored in the memory 22. The predicted monitoring time may be set depending on the situation around the vehicle 1. For example, it is expected that the time required for a lane change to become possible increases as the number of traveling vehicles around the vehicle 1 is greater. Thus the timing setting unit 31 may increase the predicted monitoring time as the number of traveling vehicles around the vehicle 1 is greater. In this case, the timing setting unit 31 detects vehicles by inputting an image obtained by the camera 2 into a classifier that has been trained to detect vehicles, and counts the number of detected vehicles. As such a classifier, the timing setting unit 31 may use, for example, a DNN having architecture of a convolutional neural network type, such as Single Shot MultiBox Detector or Faster R-CNN. In the case that the vehicle 1 includes a range sensor, such as a LiDAR sensor, the timing setting unit 31 may detect traveling vehicles around the vehicle 1 by inputting a ranging signal obtained by the range sensor into a classifier. The range sensor is another example of a sensor that generates a sensor signal representing the situation around the vehicle 1.

The timing setting unit 31 further sets an acceleration, based on the current speed of the vehicle 1, by referring to a reference table representing a correspondence between vehicle speeds and accelerations.

The timing setting unit 31 notifies the control unit 32 of information for identifying the set acceleration/deceleration start timing and gear change timing as well as the deceleration or the acceleration. The information for identifying the acceleration/deceleration start timing may be, for example, information indicating the position corresponding to the acceleration/deceleration start timing (the position nearer than the start point of the next curve or the target location by the predetermined distance) or information indicating the time from the current time until the acceleration/deceleration start timing. Similarly, the information for identifying the gear change timing may be information indicating the position corresponding to the gear change timing (the position nearer than the position corresponding to the acceleration/deceleration start timing by a distance that is the product of the gear change time and the current vehicle speed) or information indicating the time from the current time until the gear change timing.

The control unit 32 determines whether the notified gear change timing has come by referring to the elapsed time since the setting of the gear change timing or the position of the vehicle 1. When the elapsed time is equal to the notified time until the gear change timing or the position of the vehicle 1 is equal to the notified position corresponding to the gear change timing, the control unit 32 controls the automatic transmission 15 of the power train 4 to downshift the automatic transmission 15. Specifically, the control unit 32 controls the power train 4 so as to keep the RPM of the engine 11 constant. The RPM of the engine 11 may fluctuate, for example, because of external factors and may not be necessarily kept constant. However, even if fluctuations in the RPM of the engine 11 are not completely eliminated, control of the power train 4 intended to keep the RPM of the engine 11 constant is included in the control of the power train 4 of the present embodiment to keep the RPM of the engine 11 constant.

As the gear of the automatic transmission 15 is lowered, the RPM of the motor 13 increases. Thus the control unit 32 calculates the first gear ratio of the continuously variable transmission 14 after the lowering of the gear from the increased RPM of the motor 13 and the RPM of the engine 11 immediately before the downshift. Additionally, the control unit 32 calculates a target RPM of the motor 12 to keep the RPM of the engine 11 constant, depending on the ratio between the calculated first gear ratio and the second gear ratio between the RPM of the motor 12 and that of the engine 11 immediately before the downshift. The control unit 32 then controls a power supply circuit (not illustrated) for energizing the motor 12 so that the RPM of the motor 12 is equal to the target RPM.

Figure 5:
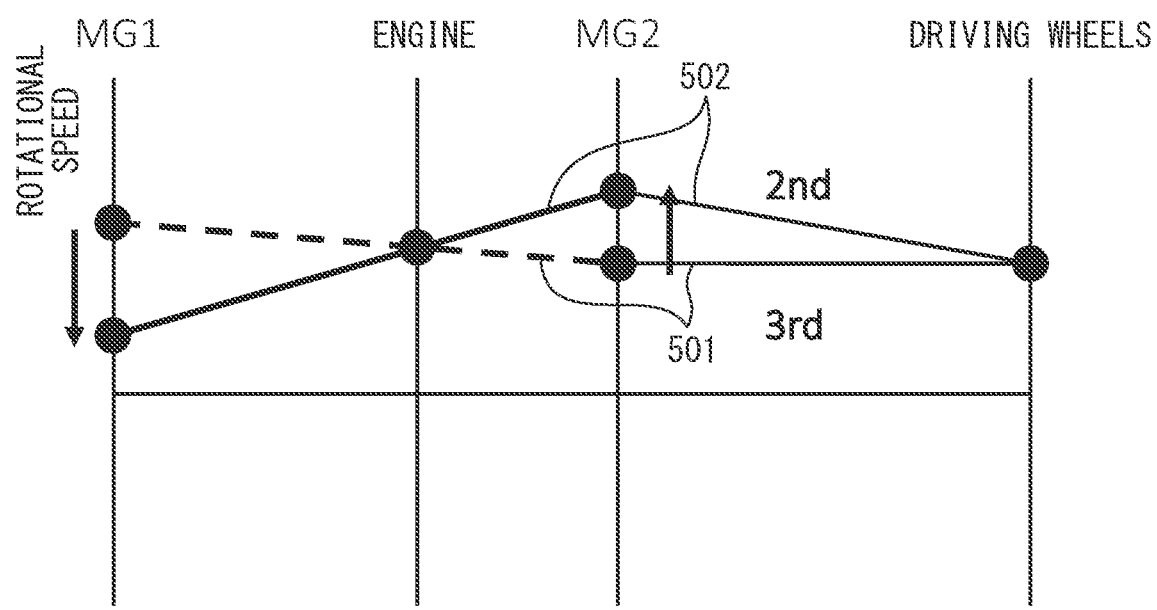
FIG. 5 is a diagram for explaining the relationship between the RPMs of driving wheels, an engine, and two motors at downshift of an automatic transmission.

FIG. 5 is a diagram for explaining the relationship between the RPMs of the driving wheels 6, the engine 11, the motor 12 (MG1), and the motor 13 (MG2) at downshift of the automatic transmission 15. In FIG. 5, the ordinate represents RPMs. In this example, lines 501 represent the relationship between the RPMs of the engine 11, the motors 12 and 13, and the driving wheels 6 for the case that the gear position of the automatic transmission 15 is the third.

Lines 502 represent the relationship between the RPMs of the engine 11, the motors 12 and 13, and the driving wheels 6 for the case that the gear position of the automatic transmission 15 is changed from the third to the second by downshift while the RPM of the engine 11 is kept constant. The downshift of the automatic transmission 15 increases the RPM of the motor 13. In the continuously variable transmission 14, the ratio between the first and second gear ratios, which are ratios between the RPMs of the engine 11 and the motor 13 and between the RPMs of the engine 11 and the motor 12, respectively, is kept constant. Thus the RPM of the engine 11 is kept constant by reducing that of the motor 12 according to the first gear ratio between the RPM of the engine 11 and that of the motor 13 after the downshift of the automatic transmission 15 so as to keep the ratio between the first and second gear ratios constant.

Additionally, the control unit 32 determines whether the notified acceleration/deceleration start timing has come by referring to the elapsed time since the setting of the acceleration/deceleration start timing or the position of the vehicle 1. When the elapsed time equals the notified time corresponding to the acceleration/deceleration start timing or the position of the vehicle 1 equals the notified position corresponding to the acceleration/deceleration start timing, the control unit 32 starts accelerating or decelerating the vehicle 1. More specifically, the control unit 32 sets target RPMs of the motors 12 and 13 so that the vehicle 1 accelerates or decelerates at the notified acceleration or deceleration. The control unit 32 then controls power supply circuits (not illustrated) for energizing the motors 12 and 13 so that the RPMs of the motors 12 and 13 equal the respective target RPMs. At acceleration, the control unit 32 further sets a target RPM of the engine 11 in accordance with instructions from the ECU for driving control. When the speed of the vehicle 1 reaches a target vehicle speed, the control unit 32 sets target RPMs of the motors 12 and 13 so that the deceleration or acceleration equals 0. The control unit 32 then controls the power supply circuits (not illustrated) for energizing the motors 12 and 13 so that the RPMs of the motors 12 and 13 equal the respective target RPMs.

Figure 6:
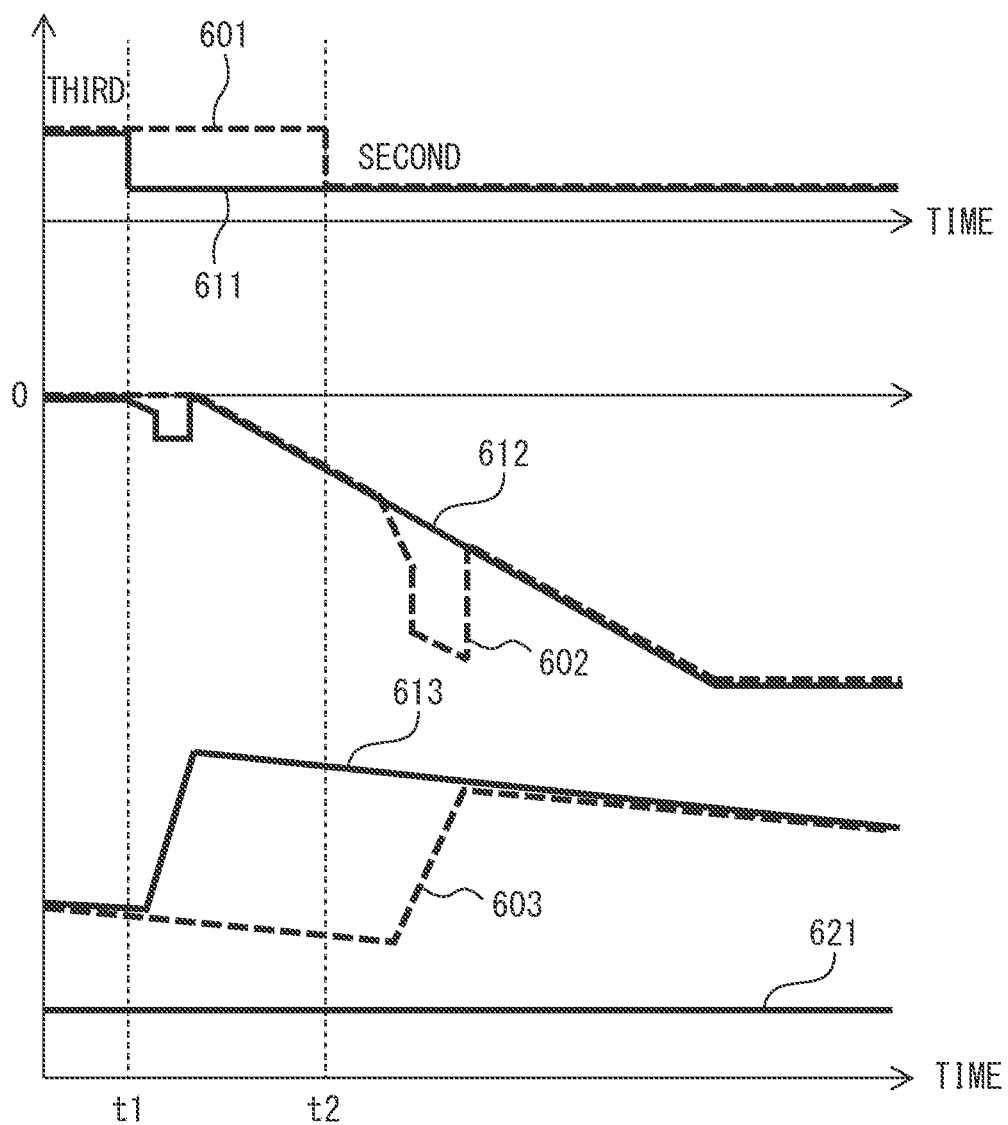
FIG. 6 is a timing chart representing the relationship between deceleration control of a vehicle and execution timing of downshift according to an embodiment and a comparative example.

FIG. 6 is a timing chart representing the relationship between deceleration control of the vehicle 1 and execution timing of downshift according to the present embodiment and a comparative example. In FIG. 6, the abscissa represents elapsed time. Waveforms 601 and 611 represent transition of the gear position of the automatic transmission 15 according to the comparative example and the present embodiment, respectively. Waveforms 602 and 612 represent transition of the deceleration of the vehicle 1 until reaching a constant deceleration at the time of deceleration according to the comparative example and the present embodiment, respectively. Waveforms 603 and 613 represent transition of the RPM of the motor 13 according to the comparative example and the present embodiment, respectively. Additionally, a waveform 621 represents transition of the RPM of the engine 11. In FIG. 6, decelerations for the case that the vehicle 1 decelerates are expressed as negative values.

In the comparative example, the gear position of the automatic transmission 15 is changed from the third to the second by downshift at time t2 after the start of deceleration of the vehicle 1, as indicated by the waveform 601. Thus the downshift after the start of deceleration of the vehicle 1 causes a relatively large and discontinuous change in speed, as indicated by the waveform 602. At this discontinuous change in speed, the driver may feel uncomfortable with a change in acceleration in the travel direction of the vehicle 1.

In the present embodiment, the gear position of the automatic transmission 15 is changed from the third to the second by downshift at time t1 before the start of deceleration of the vehicle 1, as indicated by the waveform 611. Thus the discontinuous change in speed caused by the downshift before decelerating the vehicle 1 is smaller than that caused by the downshift during the deceleration, as indicated by the waveform 612. This suggests that the driver's uncomfortable feeling caused by downshift is reduced. Additionally, even if the RPM of the motor 13 is increased by the downshift, that of the engine 11 is kept constant, as indicated by the waveforms 613 and 621. This suggests that output power is kept as intended by the driver.

Figure 7:
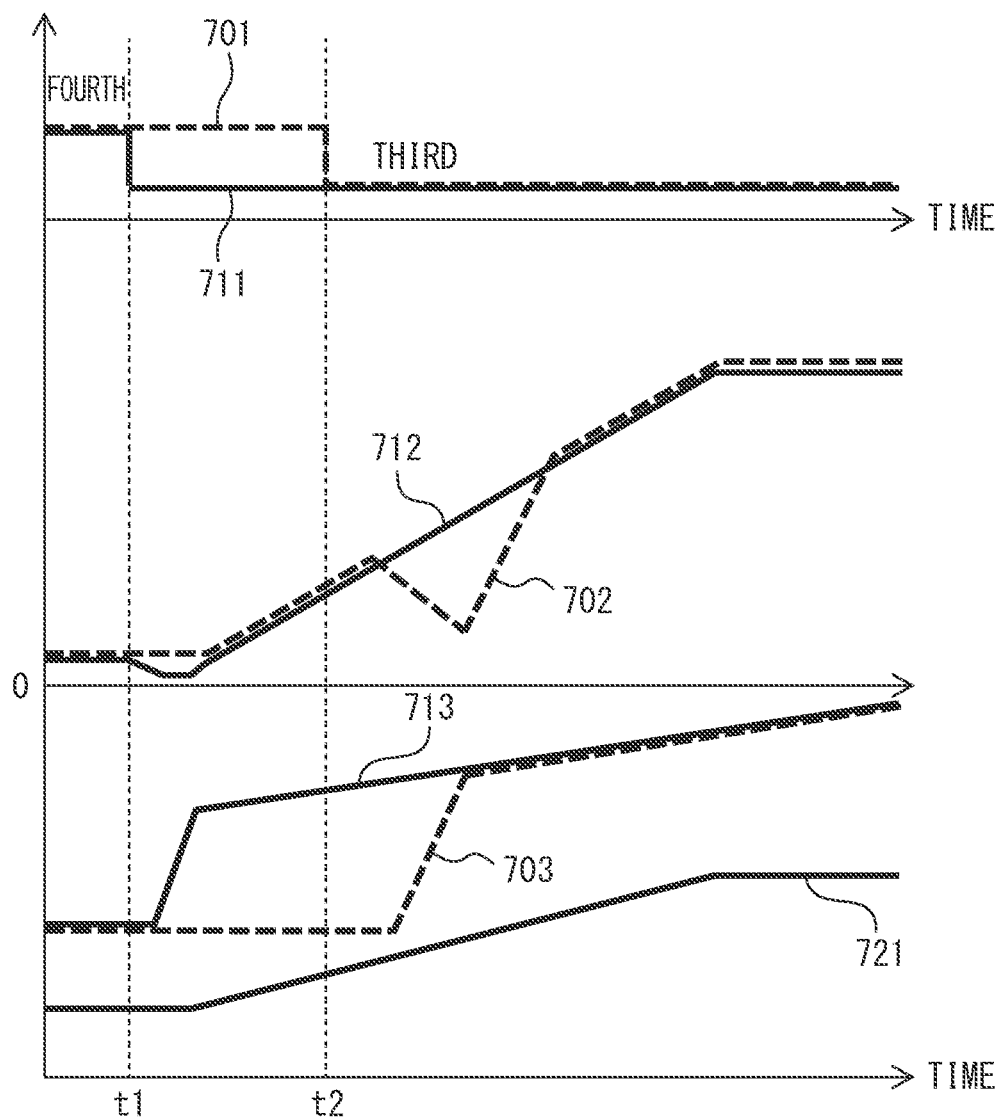
FIG. 7 is a timing chart representing the relationship between acceleration control of a vehicle and execution timing of downshift according to an embodiment and a comparative example.

FIG. 7 is a timing chart representing the relationship between acceleration control of the vehicle 1 and execution timing of downshift according to the present embodiment and a comparative example. In FIG. 7, the abscissa represents elapsed time. Waveforms 701 and 711 represent transition of the gear position of the automatic transmission 15 according to the comparative example and the present embodiment, respectively. Waveforms 702 and 712 represent transition of the acceleration of the vehicle 1 until reaching a constant acceleration at the time of acceleration according to the comparative example and the present embodiment, respectively. Waveforms 703 and 713 represent transition of the RPM of the motor 13 according to the comparative example and the present embodiment, respectively. Additionally, a waveform 721 represents transition of the RPM of the engine 11.

In the comparative example, the gear position of the automatic transmission 15 is changed from the fourth to the third by downshift at time t2 after the start of acceleration of the vehicle 1, as indicated by the waveform 701. Thus the downshift after the start of acceleration of the vehicle 1 causes a relatively large and discontinuous change in speed, as indicated by the waveform 702. At this discontinuous change in speed, the driver may feel uncomfortable with a change in acceleration in the travel direction of the vehicle 1.

In the present embodiment, the gear position of the automatic transmission 15 is changed from the fourth to the third by downshift at time t1 before the start of acceleration of the vehicle 1, as indicated by the waveform 711. Thus the discontinuous change in speed caused by the downshift before accelerating the vehicle 1 is smaller than that caused by the downshift during the acceleration, as indicated by the waveform 712. This suggests that the driver's uncomfortable feeling caused by downshift is reduced. Additionally, the downshift before acceleration prevents driving force from stopping transmitting during acceleration, which enables the ECU 5 to make the driver unlikely to feel slowness. Additionally, even if the RPM of the motor 13 is increased by the downshift, that of the engine 11 is kept constant during the downshift, as indicated by the waveform 713. This reduces the difference between the timing at which the RPM of the engine 11 increases and the timing at which the vehicle 1 starts accelerating, which enables the ECU 5 to prevent making the driver feel unnatural.

Figure 8:
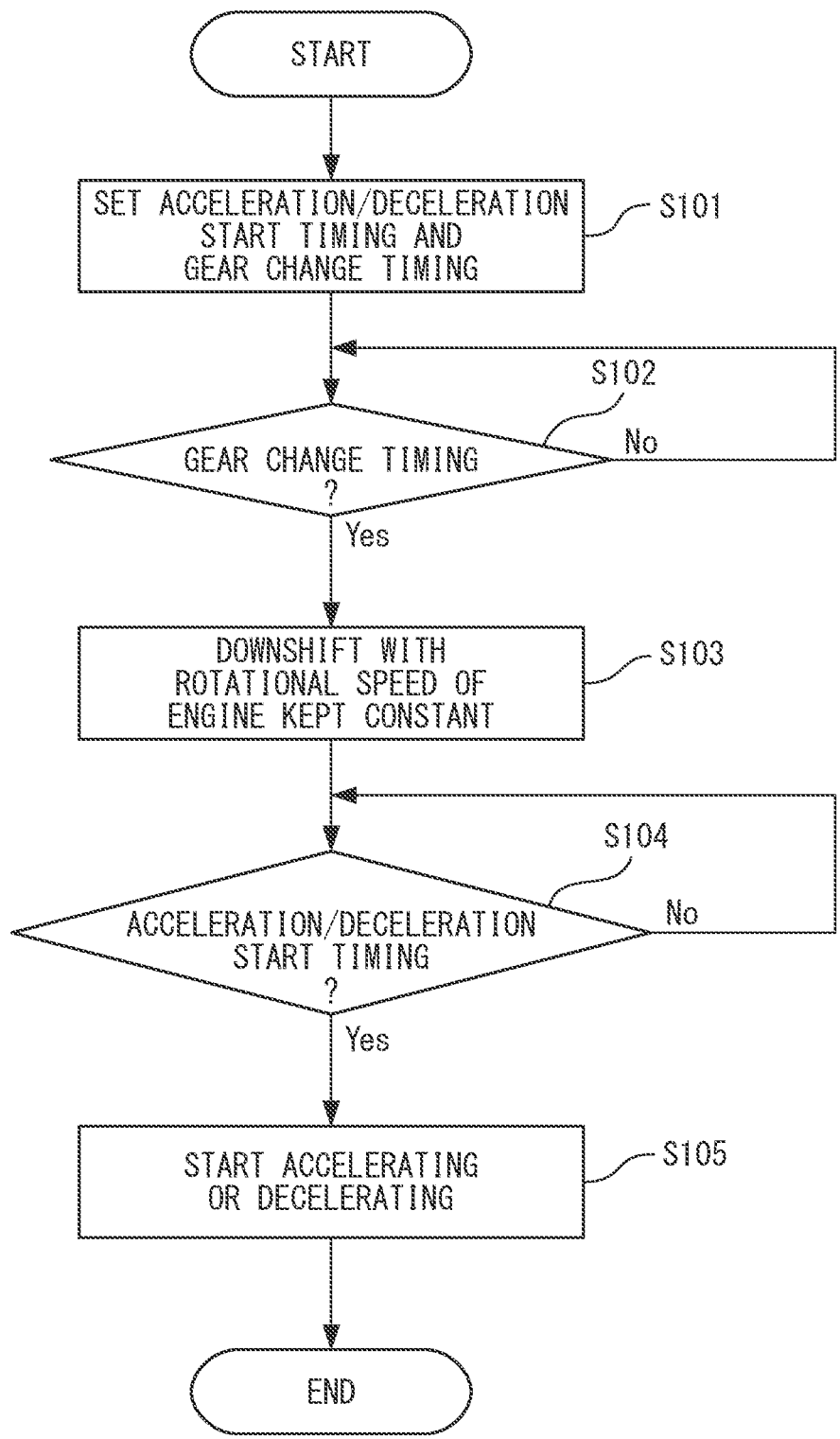
FIG. 8 is an operation flowchart of the transmission control process.

FIG. 8 is an operation flowchart of the transmission control process executed by the processor 23. The processor 23 executes the transmission control process in accordance with this operation flowchart.

The timing setting unit 31 of the processor 23 sets acceleration/deceleration start timing and gear change timing, based on at least one of an image from of the camera 2, the current position of the vehicle 1, the map information, and operation of the vehicle 1 by the driver (step S101).

The control unit 32 of the processor 23 determines whether the set gear change timing has come (step S102). When the gear change timing has not come (No in step S102), the control unit 32 repeats the processing of step S102 after a predetermined time. When the gear change timing has come (Yes in step S102), the control unit 32 downshifts the automatic transmission 15 while controlling the overall operation of the power train 4 so as to keep the RPM of the engine 11 constant (step S103).

Thereafter, the control unit 32 determines whether the acceleration/deceleration start timing has come (step S104).

When the acceleration/deceleration start timing has not come (No in step S104), the control unit 32 repeats the processing of step S104 after a predetermined time. When the acceleration/deceleration start timing has come (Yes in step S104), the control unit 32 starts accelerating or decelerating the vehicle 1 (step S105). When the speed of the vehicle 1 reaches a target speed after the acceleration or deceleration, the processor 23 stops accelerating or decelerating the vehicle 1 and terminates the transmission control process.

As has been described above, the transmission controller predicts timing at which the vehicle accelerates or decelerates. Before accelerating or decelerating the vehicle, the transmission controller downshifts the automatic transmission of the power train while keeping the RPM of the engine constant. Thus the transmission controller can make changes in acceleration caused by downshift smaller and changes in engine output caused by changes in the engine RPM smaller than when the automatic transmission downshifts during acceleration or deceleration. This enables the transmission controller to prevent making the driver uncomfortable at acceleration or deceleration of the vehicle.

According to a modified example, a processor (not illustrated) of the electronic control unit for driving control may execute the processing of the timing setting unit 31. Alternatively, the electronic control unit for driving control and the ECU 5 may be integrated into a single electronic control unit.

According to another modified example, the power train, which is a target for transmission control by the transmission controller, may be one including a single motor and a single engine. For example, the power train may include an engine, a clutch, a motor, a torque converter, and an automatic transmission in order of transmission of motive power from the engine. In this case also, the control unit 32 downshifts the automatic transmission at gear change timing earlier than predicted acceleration/deceleration start timing. However, in this case, the control unit 32 controls the clutch to uncouple the engine from the automatic transmission so as to keep the RPM of the engine constant at the downshift. In this modified example also, the transmission controller has the same advantageous effect as that of the embodiment.

The computer program for achieving the functions of the processor 23 of the ECU 5 according to the embodiment or modified examples may be provided in a form recorded on a computer-readable and portable medium, such as a semiconductor memory, a magnetic medium, or an optical medium.

As described above, those skilled in the art may make various modifications according to embodiments within the scope of the present invention.

What is claimed is:

1. A transmission controller of a power train including a first transmission and a second transmission mounted on a vehicle, the first transmission being capable of steplessly varying a first gear ratio between one of two motors and an engine and a second gear ratio between the other of the two motors and the engine so as to keep the ratio of the second gear ratio to the first gear ratio constant, the second transmission being capable of setting a gear ratio between one of the two motors and a driving wheel at one of a predetermined number of gear ratios, the transmission controller comprising:
a processor configured to:
set acceleration/deceleration start timing at which the vehicle starts accelerating or decelerating, based on at least one of a sensor signal representing the situation around the vehicle, the current position of the vehicle, a map including information on a road being traveled by the vehicle, and operation of the vehicle by a driver of the vehicle,
downshift the second transmission before the acceleration/deceleration start timing, and
control the power train to vary the first gear ratio and the second gear ratio of the first transmission so as to keep the RPM of the engine constant.

2. The transmission controller according to claim 1, wherein the processor is further configured to predict time from when a controller that controls driving of the vehicle proposes passing a leading vehicle traveling ahead of the vehicle until the driver performs operation of approval for the propose, based on elapsed time from a past proposal for passing until operation of approval, and the processor sets timing at which the vehicle starts accelerating as the acceleration/deceleration start timing, based on the predicted time.

3. The transmission controller according to claim 2, wherein the processor determines a time after a period from the proposal for passing as the acceleration/deceleration start timing, the period being a predicted time from the proposal for passing until the driver performs operation of approval plus a predicted time required to confirm that passing of the leading vehicle can be started.

4. The transmission controller according to claim 1, wherein the processor sets timing at which the vehicle starts decelerating as the acceleration/deceleration start timing, based on the distance in a travel direction of the vehicle from the vehicle to a next curve and at least one of the speed of the vehicle and the radius of curvature of the next curve.

5. The transmission controller according to claim 1, wherein the processor sets timing at which the vehicle starts decelerating as the acceleration/deceleration start timing, based on the distance in a travel direction of the vehicle from the vehicle to a deceleration-required location at which deceleration is required and at least one of the speed of the vehicle and a drivable speed of the vehicle at the deceleration-required location.

6. A method for controlling transmission of a power train including a first transmission and a second transmission mounted on a vehicle, the first transmission being capable of steplessly varying a first gear ratio between one of two motors and an engine and a second gear ratio between the other of the two motors and the engine so as to keep the ratio of the second gear ratio to the first gear ratio constant, the second transmission being capable of setting a gear ratio between one of the two motors and a driving wheel at one of a predetermined number of gear ratios, the method comprising:
setting acceleration/deceleration start timing at which the vehicle starts accelerating or decelerating, based on at least one of a sensor signal representing the situation around the vehicle, the current position of the vehicle, a map including information on a road being traveled by the vehicle, and operation of the vehicle by a driver; and
downshifting the second transmission before the acceleration/deceleration start timing, and
controlling the power train to vary the first gear ratio and the second gear ratio of the first transmission so as to keep the RPM of the engine constant.

7. A non-transitory recording medium that stores a computer program for controlling transmission of a power train including a first transmission and a second transmission mounted on a vehicle, the first transmission being capable of steplessly varying a first gear ratio between one of two motors and an engine and a second gear ratio between the other of the two motors and the engine so as to keep the ratio of the second gear ratio to the first gear ratio constant, the second transmission being capable of setting a gear ratio between one of the two motors and a driving wheel at one of a predetermined number of gear ratios, the computer program causing a processor of the vehicle to execute a process comprising:

setting acceleration/deceleration start timing at which the vehicle starts accelerating or decelerating, based on at least one of a sensor signal representing the situation around the vehicle, the current position of the vehicle, a map including information on a road being traveled by the vehicle, and operation of the vehicle by a driver; and downshifting the second transmission before the acceleration/deceleration start timing, and controlling the power train to vary the first gear ratio and the second gear ratio of the first transmission so as to keep the RPM of the engine constant.

\* \* \* \* \*